No. 690,199. Patented Dec. 31, 1901.
J. G. SMITH, W. S. TEMPLE & J. POWELL.
APPARATUS FOR THE MANUFACTURE OF PLATE GLASS.
(Application filed Nov. 1, 1898.)
(No Model.) 3 Sheets—Sheet 1.
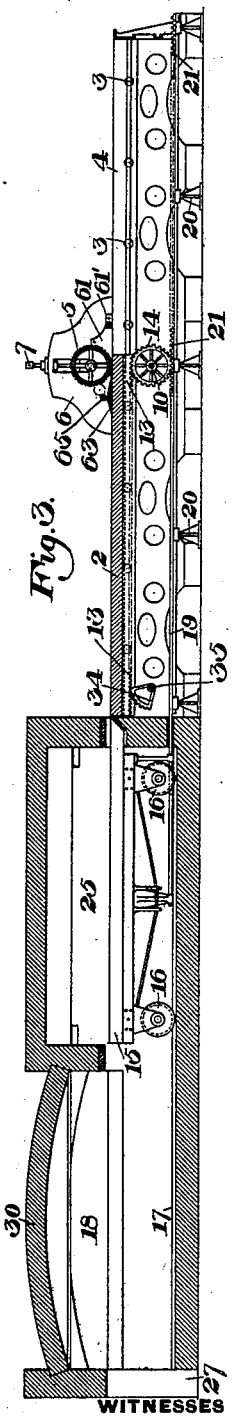
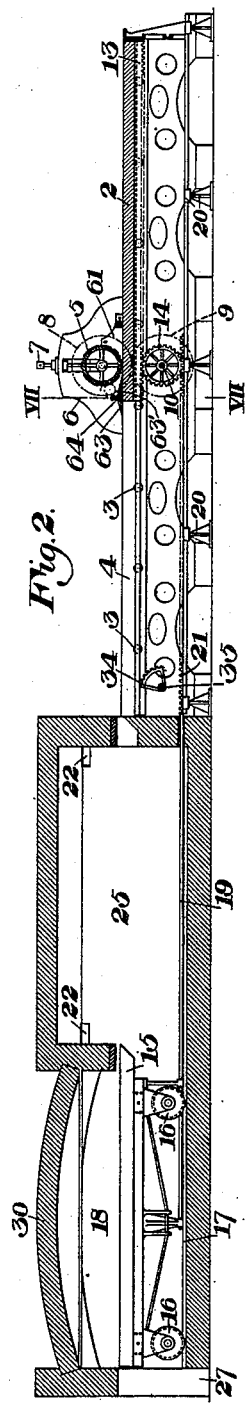
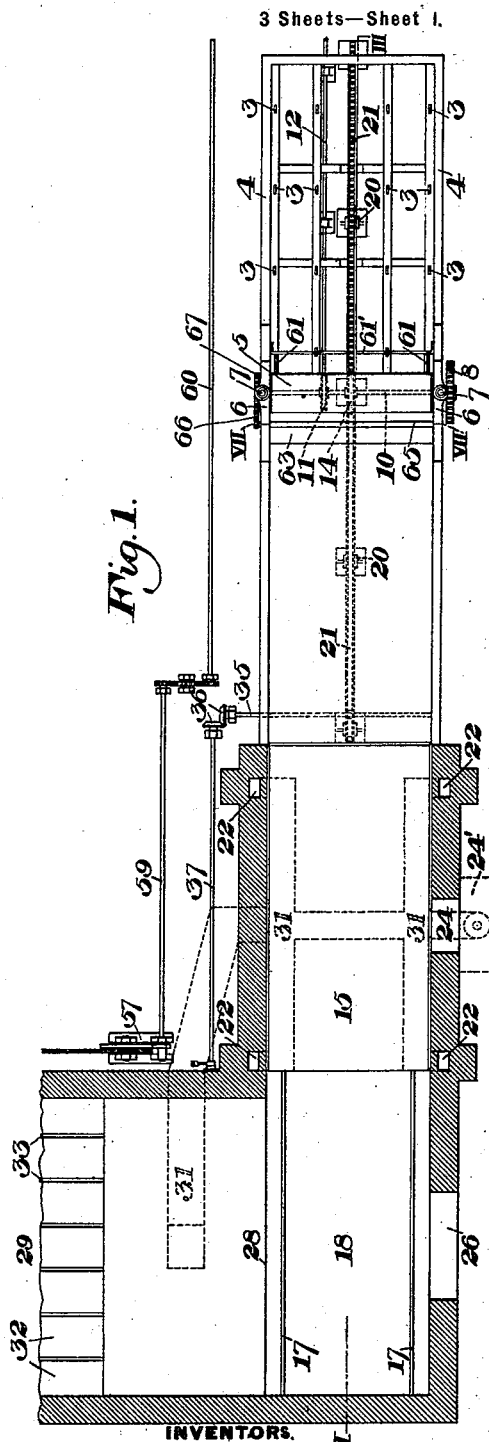
WITNESSES
INVENTORS.
John G. Smith, Wm. S. Temple, Jos. Powell
by Bakewell & Bakewell
their Attorneys.

No. 690,199. Patented Dec. 31, 1901.
J. G. SMITH, W. S. TEMPLE & J. POWELL.
APPARATUS FOR THE MANUFACTURE OF PLATE GLASS.
(Application filed Nov. 1, 1898.)
(No Model.) 3 Sheets—Sheet 2.
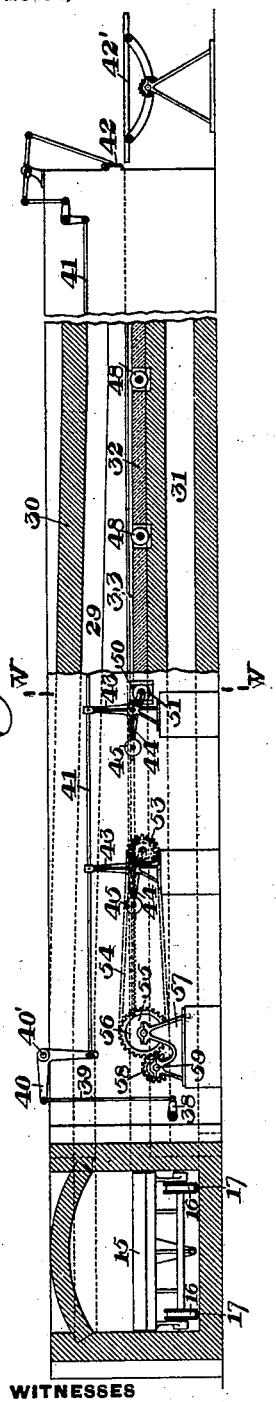
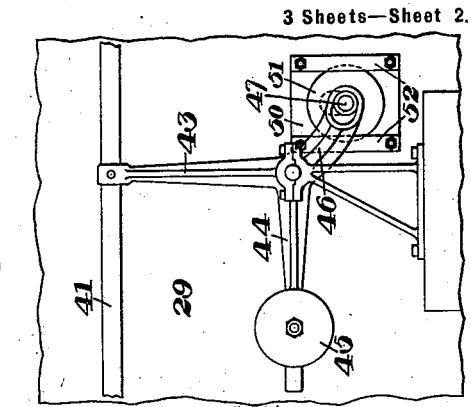
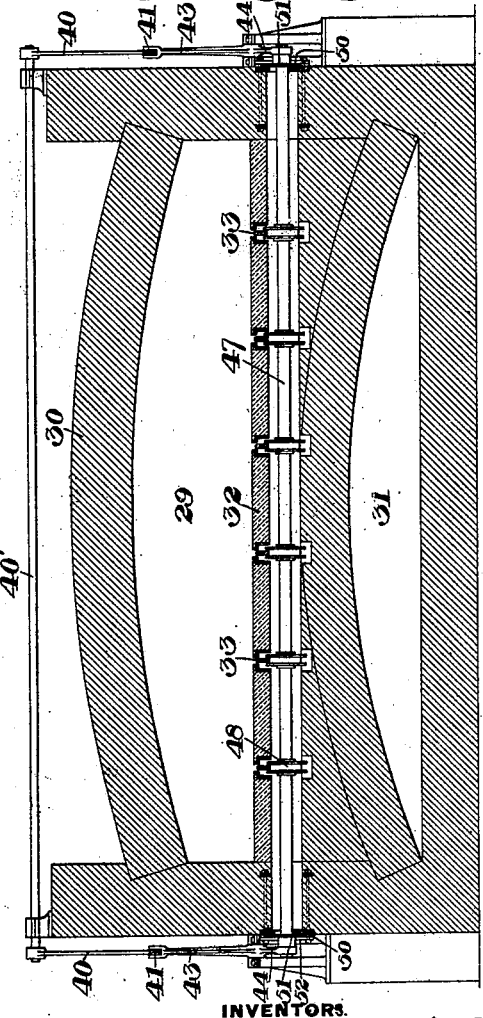
WITNESSES
INVENTORS.

No. 690,199. Patented Dec. 31, 1901.
J. G. SMITH, W. S. TEMPLE & J. POWELL.
APPARATUS FOR THE MANUFACTURE OF PLATE GLASS.
(Application filed Nov. 1, 1898.)
(No Model.) 3 Sheets—Sheet 3.
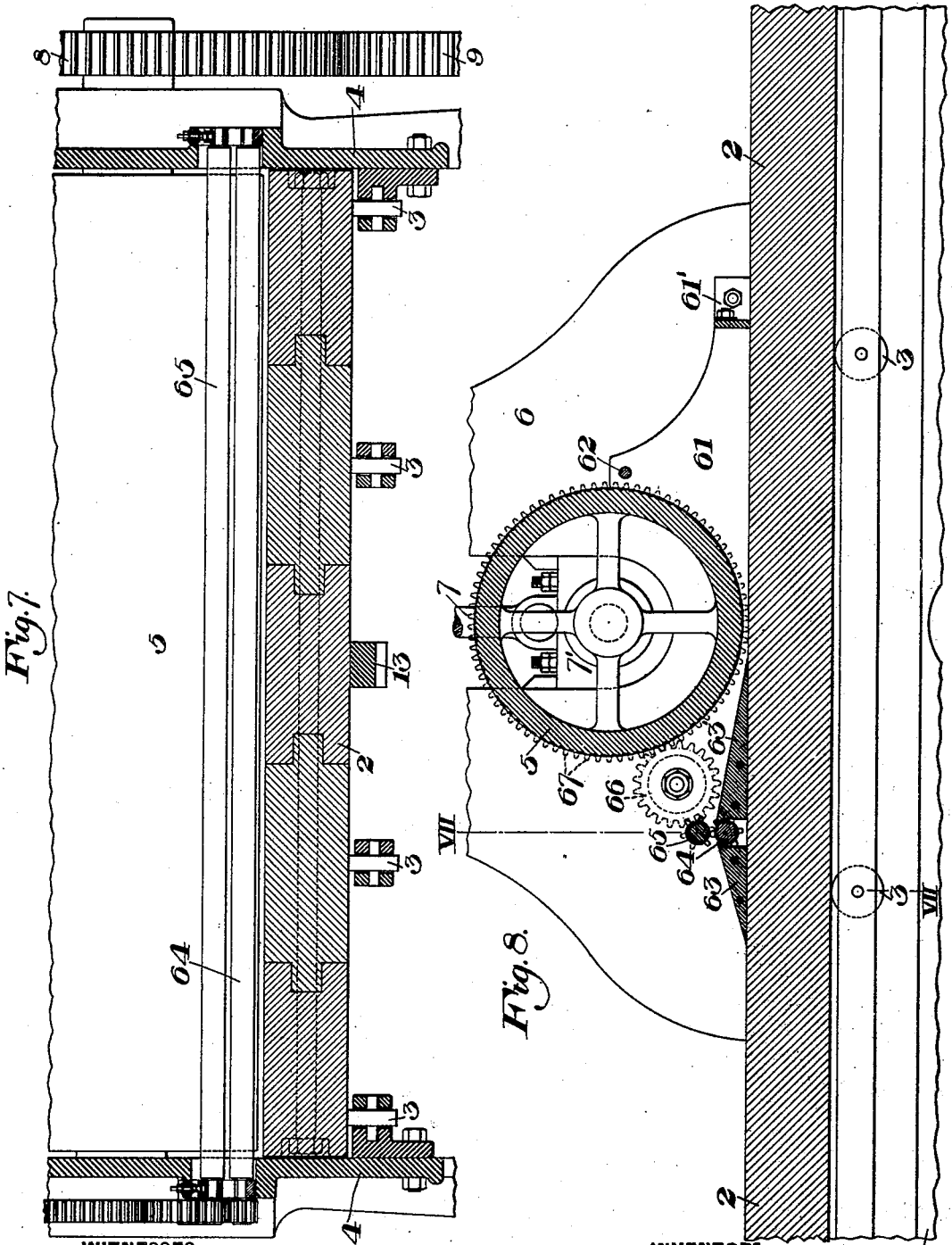
WITNESSES
INVENTORS.

UNITED STATES PATENT OFFICE.

JOHN G. SMITH, WILLIAM S. TEMPLE, AND JOSEPH POWELL, OF JEANNETTE, PENNSYLVANIA.

APPARATUS FOR THE MANUFACTURE OF PLATE-GLASS.

SPECIFICATION forming part of Letters Patent No. 690,199, dated December 31, 1901.

Application filed November 1, 1898. Serial No. 695,165. (No model.)

*To all whom it may concern:*

Be it known that we, JOHN G. SMITH, WILLIAM S. TEMPLE, and JOSEPH POWELL, of Jeannette, in the county of Westmoreland and State of Pennsylvania, have invented a new and useful Improvement in Apparatus for the Manufacture of Plate-Glass, of which the following is a full, clear, and exact description, reference being had to the accompanying drawings, forming part of this specification, in which—

Figure 1 is a plan view of our improved apparatus, partly in section, with the leer broken away. Figs. 2 and 3 are longitudinal sections on line II II of Fig. 1, showing the different parts in their relative positions before and after a single operation, respectively. Fig. 4 is a side elevation, partially in section, of the leer. Fig. 5 is a cross-section on the line V V of Fig. 4. Fig. 6 is an enlarged detail view of part of the leer-bar-raising mechanism. Fig. 7 is an enlarged detail vertical partial cross-section of the rolling mechanism on line VII VII of Figs. 1, 2, and 8; and Fig. 8 is a left side sectional elevation thereof.

Our invention relates to the art of making plate-glass and is designed to afford an apparatus whereby the plate is produced continuously and in substantially finished condition without the necessity of further manipulation in the way of grinding and polishing; and it consists in the hereinafter more fully described novel arrangement of machinery and parts.

Hitherto in the art of making plate-glass the greatest difficulty, and consequently the prime factor of the great expense thereof, has been to produce the plate with even surface, inasmuch as the plate after flowing or rolling has presented a pitted or wavy surface, which defects have had to be removed by the long and tedious process of grinding and polishing. By the use of our invention these defects are entirely avoided and we are enabled to manufacture continuously plates having fine glazed finish without grinding and polishing.

Referring to the drawings, in which we show our preferred form of apparatus and in which like figures of reference indicate like parts, 2 is a movable table preferably constructed of longitudinal keyed sections upon which the plate is formed, mounted on roller-bearings 3 in frame 4.

5 is a forming-roller mounted in housings 6 6 at the center of frame 4 and is adjustable vertically by means of screws 7 7, suitably controlling bearings 7', to permit of the manufacture of plates of different thickness, as desired, and having cog-wheel 8 at the end thereof which meshes with cog-wheel 9 on shaft 10, mounted within frame 4. Shaft 10 is provided with cog-wheel 11, connected by suitable means with power-shaft 12. On the under side of table 2 we provide a rack 13, meshing with cog-wheel 14 on shaft 10, adapted to slide table 2 under roller 5 to and from reflattening-oven 25. It will be observed that as table 2 is moved by cog-wheel 14, which is on the same shaft as gear-wheel 9, which rotates roller 5, the movement of table 2 and roller 5 will at all times be in unison.

15 is a bogie mounted on wheels 16, movable on tracks 17 between reflattening-oven 25 and cooling-oven 18. In order that the movement of bogie 15 shall be synchronous with that of table 2, we provide a rod 19, attached to bogie 15, sliding in supports 20 and having rack 21 at its other end adapted to engage the lower portion of the periphery of cog-wheel 14, so that by rotating cog-wheel 14, as shown in Fig. 2, toward the left table 2 will reach the end wall of reflattening-oven 25 at the same moment that bogie 15 reaches it, as shown in Fig. 3.

22 represents flues at the four upper corners of the reflattening-oven, and 24 is an opening in side wall thereof for the admission of heat thereto generated by suitable furnace 24'. The cooling-oven 18 has opening 26 in side wall to permit of such hand manipulation of the plates as may be necessary and manhole-doors 27 in end thereof.

28 is the set-stone at head of leer 29, said leer having a downwardly-contracting arched roof 30 and a flue 31 beneath the bur-bricks 32, running the entire length of the leer, and by passing the waste heat from the reflattening-oven 25 therethrough we obtain an equalization of heat on both sides of the plates within the leer, thus preventing warping of the same. While this flue 31 may be heated by other means, for obviously economic reasons we prefer to utilize waste heat, as described, providing flues 31', as shown by dotted lines in Fig. 1, therefor.

To provide suitable automatic means for raising and sliding the bars 33 in said leer, we proceed as follows: In frame 4 beneath the plane of movement of table 2 we journal cogged sector 34, adapted to mesh with rack 13 on the under side of table 2 when said table is near the end of its movement toward reflattening-oven 25, as shown in Figs. 2 and 3, so that the limit of movement of shaft 35, upon which sector 34 is keyed, shall be about one-fourth revolution. This motion is transmitted from shaft 35 through beveled cog-wheels 36 to shaft 37, as shown in Fig. 1, to lever 38, as shown in Fig. 4, thence to rod 39 and by bell-crank levers 40, connected by transverse bar 40', to bars 41 on each side of leer, which extend the entire length of same and terminate in suitable levers for automatically opening and closing flap-door 42 and for operating the tilting table 42'. To bars 41 at suitable intervals we attach levers 43 of the design shown in Fig. 6, having arms 44, with counterbalance-weights 45 and slotted pendant 46, carrying raising-shafts 47, said shafts 47 being provided with rollers 48, adapted to carry leer-bars 33. To insure closure of the slotted openings in sides of leer necessary for the passage of ends of raising shafts 47 therethrough, we provide slotted plates 50, hermetically attached to the exterior wall of leer with circular plate 51, through which the ends of said shafts 47 pass to engage slotted pendant 46, said plate 51 working vertically in close contact with plates 50 and retained therewith by plates 52. It will therefore be apparent that when table 2 in its movement toward reflattening-oven 25 reaches cogged sector 34 the cogs of rack 13 will engage the same, and in the further movement of said table 2 said sector will be caused to turn in the direction of the movement of the table, causing thereby a downward movement of rod 39 and a consequent automatic raising of shaft 47, leer-bars 49, and the plates thereon. To give the leer-bars the necessary outward and retracting movement by the rotation of the rollers 48 when in upper or lower position, we provide one of shafts 47 with a sprocket 53 outside the leer, carrying-chain 54 meshing with sprocket 55, which is attached to cog-wheel 56 on standard 57.

58 is a cog-wheel on shaft 59, meshing with cog-wheel 58, said shaft 59 being suitably connected with power-shaft 60, which we preferably extend so as by any suitable mechanism to be under the control of the operator manipulating power-shaft 12. We do not, however, wish to be understood as claiming herein the above-described leer mechanism, as the same forms the subject-matter of a copending application filed April 29, 1899, Serial No. 714,987.

Referring now more particularly to Figs. 7 and 8, in which we show, as stated, an enlarged view of the rolling mechanism, we provide adjustable guides 61, having connecting-bar 62, adapted to adjust said guides 61 to and from each other, so that the width of the plate may be determined. These guides 61 are suitably adjustably retained preferably by clamps 61' on frame 4. 63 63' are stripping-knives at the rear of roller 5, firmly secured to the sides of the frame 4, as shown more particularly in Fig. 1, and in sliding contact with table 2, so that with the forward movement of the table the plate will be raised therefrom. 64 and 65 are polishing-rollers placed, as shown in Fig. 8, between knives 63 and 63', adapted to pass the plate between said rollers, rapid motion being imparted thereto through an intermediate cog-wheel 66 by cog-wheel 67, integral with roller 5, so that the rotation of rollers 64 and 65 shall be synchronous with said roller 5. It will therefore be apparent that the plate upon emerging from beneath the roller 5 will be caught by knife 63' and pass between polishing-rollers 64 and 65 and return to table 2 by knife 63. These polishing-rollers 64 and 65 are provided with the usual coating of paste.

The operation of our device is as follows: The parts being as shown in Fig. 2, the melted glass is inserted between guides 61, said guides having been adjusted laterally to their desired width. Power is then applied to shaft 12, causing roller 5 to rotate, at the same time moving forward table 2 beneath the roller, said roller 5 having previously been adjusted vertically to a desired height from table 2 to allow for the desired thickness of the plate. As heretofore described, the plate in passing from beneath roller 5 is lifted from table 2 by the knife 63', rapidly polished on both sides by polishing-rollers 64 65, and returned to said table during its passage toward reflattening-oven 25 by the knife or guide 63. As table 2 proceeds toward reflattening-oven 25 bogie 15, by reason of rack 21, is caused to move in the opposite direction and arrives at position as shown in Fig. 3 at the same instant that table 2 reaches same. The rolled plate on table 2 is thereupon moved upon bogie 15 then in reflattening-oven 25, wherein the heated gases are caused to act on said plate. Power-shaft 12 is then reversed, causing table 2 to move back to the position as shown in Fig. 2, while at the same time bogie 15 is moved from reflattening-oven into cooling-chamber 18. Thereupon the plate is removed from bogie 15 by operator stationed at opening 26 and placed upon set-stone 28. It will be observed that when bogie 15 is in position as shown in Fig. 2, table 2 will be at its original position and ready for a repetition of the operation of rolling. When the operation of rolling, as above described, is recommenced and bogie 15 is moved from cooling-chamber 18 into reflattening-oven 25, the plate upon set-stone 28 is moved by the operator upon bur-bricks and leer-bars 32 and 33 in leer 29. The operation is then repeated. Another plate is rolled and manipulated as above described. It will be observed that as table 2 has reached the end of its movement it causes sector 34 to make a quarter-revolution, thus imparting motion to shafts 35 and 37, thus causing a raising of bars 33, as hereinbefore described, and a consequent raising of the plate thereon. Power is then applied to shaft 60, causing outward movement of the bars, and as table 2 ceases to engage sector 34 on returning to its initial position, as shown in Fig. 2, the bars 33 are dropped out of contact with plates thereon and caused to return to their initial position by reversal of power-shaft 60.

Many advantages arise from the use of our improved apparatus herein shown that will be appreciated by those skilled in the art, since it affords a simple and efficient means for handling and manipulating the plates and for securing good results and permits of a rapid and continuous production of perfect plates.

Many changes may be made in the parts of the apparatus without departure from our invention, since

What we claim is—

1. In plate-glass apparatus, the combination with a roller mounted in stationary bearings, of a table movable thereunder, a stripping-knife located above and in contact with the table, and arranged to strip the plate therefrom, and polishing-rollers arranged to act upon the plate so stripped; substantially as described.

2. In plate-glass apparatus, a roller mounted in stationary vertically-adjustable bearings, a table movable thereunder, mechanism for moving the table synchronously with the rotation of the roller, a stripping-knife located above and in contact with the table, and arranged to strip the plate therefrom, and polishing apparatus arranged to act upon the plate so stripped; substantially as described.

3. In plate-glass apparatus, the combination with a roller, of a table movable thereunder, a stripper-knife in contact with the table and arranged to strip the plate therefrom, polishing-rollers arranged to act upon the stripped plate, and a guide for returning the polished plate to the table; substantially as described.

4. In plate-glass apparatus, a roller, a table movable thereunder, a bogie movable toward and from the table, and connections between the table and bogie, arranged to move the bogie toward the table as the table moves forward; substantially as described.

5. In plate-glass apparatus, a roller, a table movable thereunder, a leer having movable bars, and actuating connections between the table and the bars; substantially as described.

6. In apparatus for making plate-glass, the combination of a stationary roller having adjustable guides, a table adapted to move thereunder in synchrony with the revolution of said roller, stripping-knives in sliding contact with said table, means for polishing and passing the forming-plate over said knives, a bogie acting reciprocally with said table and actuating connections between the bogie and the table substantially as described.

In testimony whereof we have hereunto set our hands.

JOHN G. SMITH.
WILLIAM S. TEMPLE.
JOSEPH POWELL.

Witnesses:
GEORGE B. BLEMMING,
LEILA M. REDMAN.